UNITED STATES PATENT OFFICE 2,450,234

AUTOCONDENSATION POLYMERS OF UN-
SATURATED GLYCIDYL ETHERS AND
METHOD OF PRODUCING SAME

Theodore W. Evans and Edward C. Shokal, Oakland, Calif., assignors to Shell Development Company, San Francisco, Calif., a corporation of Delaware No Drawing. Application December 7, 1943,
Serial No. 513,298

8 Claims. (Cl. 260—80)

This invention relates to unsaturated ethers of polyglycerols, to their preparation and polymerization.

Unsaturated ethers of glycerol have been previously prepared and polymerized to resinous form. We have now discovered the unsaturated ethers of polyglycerols and have found that resins based thereupon have valuable properties not resident, so far as we are aware, in any other resins.

Accordingly it is an object of the invention to provide new compounds. Another object is to provide compounds forming the basis of new resins. Another object is to provide new polymerizable compounds. Another object is to provide new resins. Another object is to provide new polymeric materials. Other objects will be apparent from the description of the invention given hereinafter.

The compounds with which the invention is principally concerned are unsaturated ethers of polyglycerols having not more than one unsaturated ether radical per glycerol unit, i. e. per each three carbon atoms of the polyglycerol.

The unsaturated alcohols whose radicals constitute part of the ethers of the invention are aliphatic in character, and preferably contain from two to thirteen carbon atoms per molecule. The most important alcohols are compounds which have in the molecule an unsaturated linkage of aliphatic character between two carbon atoms one of which is joined to a carbon atom which is directly joined to an alcoholic hydroxyl group. These compounds can be described also as alcohols of aliphatic character having an unsaturated linkage between two carbon atoms at least one of which is not more than once removed from the alcoholic hydroxyl group.

One sub-group of unsaturated alcohols within the foregoing definition consists of compounds having an unsaturated linkage of aliphatic character between two carbon atoms one of which is directly attached to an alcoholic hydroxyl group. These compounds are, thus, alpha-unsaturated alcohols. The most desirable alpha-unsaturated alcohols are vinyl-type alcohols, which are compounds having a double bond of aliphatic character between two carbon atoms one of which is directly attached to an alcoholic hydroxyl group. Vinyl-type alcohols are alcohols of aliphatic character having an alpha-beta double bond. Vinyl-type alcohols have a structure which may be represented by the general formula

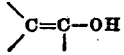

Of the vinyl-type alcohols a preferred subgroup consists of compounds having a terminal methylene group attached by an olefinic double bond to a carbinol carbon atom, as represented by the general formula

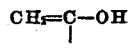

Examples of preferred vinyl-type alcohols are vinyl alcohol, isopropenol, buten-1-ol-2, etc. Examples of other vinyl-type alcohols are propen-1-ol-1, buten-1-ol-1, cyclohexen-1-ol-1, and cyclopenten-1-ol-1, etc. Vinyl alcohol is the preferred specific alpha-unsaturated alcohol.

Another important subgroup of unsaturated alcohols consists of compounds having an unsaturated linkage of aliphatic character between two carbon atoms one of which is directly attached to a saturated carbon atom which in turn is directly attached to an alcoholic hydroxyl group. These are the beta-unsaturated alcohols. The unsaturated carbon-to-carbon linkage may be a triple bond, as in propargyl alcohol, 2-methyl-butyl-3-ol-2, 2-methyl-hexyn-3-ol-2, octyn-2-ol-1, nonyn-2-ol-1, decyn-3-ol-2 and 2-methyl-nonyn-3-ol-2. More commonly, the unsaturated carbon-to-carbon linkage is a double bond. Compounds having a double bond of aliphatic character between two carbon atoms one of which is attached to a saturated carbinol carbon atom are allyl-type alcohols. They have in the molecule a structure which can be represented by the general formula

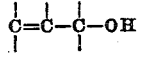

Preferred allyl-type alcohols have a terminal methylene group attached by a double bond to a carbon atom which is directly attached to a saturated carbinol carbon atom, as represented by the general structural formula

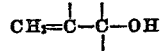

Further preferred are allyl-type alcohols of the latter formula wherein the carbinol carbon atom is primary or secondary, as represented by the formula

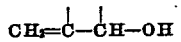

Representative examples of preferred allyl-type alcohols are the following: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohex-2-ol-1, etc.

The unsaturated alcohols whose radicals constitute part of the ethers of the present invention preferably have no more than 13 carbon atoms in the molecule and have at least one unsaturated carbon-to-carbon linkage for each 6 carbon atoms. The alcohols themselves need not be capable of separate existence. It is essential only that the compounds of the invention containing the alcohol radicals be stable.

The compounds of the invention are polyethers of polyglycerols with unsaturated alcohols. The invention is concerned particularly with unsaturated ethers of polyglycerols having not more than one unsaturated ether radical per glycerol unit. The compounds have, as a lower limit, at least one unsaturated ether group per molecule, and there may be present, as an upper limit, one unsaturated ether group for each glycerol unit. Thus, the diglycerol compounds may have one or two unsaturated ether groups; the triglycerol compounds may have one, two, or three unsaturated ether groups. Compounds having the larger number of unsaturated ether groups are preferred in accordance with the invention.

The unsaturated ether groups in any molecule may be alike or different, i. e. the compounds may be mixed ethers.

Any hydroxyl groups of the polyglycerol not etherified with unsaturated organic radicals may be etherified by other radicals, or esterified, or replaced by halogen or the like.

Typical examples of compounds with which the invention is concerned are the following: diglycerol divinyl ether, diglycerol di-isopropenyl ether, diglycerol dipropargyl ether, diglycerol di(2-methylbutyn-3-yl-2) ether, diglycerol diallyl ether, diglycerol dimethallyl ether, diglycerol di-chloroallyl ether, diglycerol di(buten-1-yl-3) ether, diglycerol allyl vinyl ether, diglycerol allyl methallyl ether, diglycerol allyl choroallyl ether, diglycerol allyl isopropenyl ether, diglycerol vinyl chloroallyl ether, diglycerol vinyl isopropenyl ether, diglycerol monovinyl ether, diglycerol mono-isopropenyl ether, diglycerol monopropargyl ether, diglycerol mono-allyl ether, diglycerol monomethallyl ether, diglycerol monochloroallyl ether, diglycerol monocrotyl ether, diglycerol divinyl ether diacetate, di(beta-methyl-glycerol) divinyl ether, di(beta-methyl-glycerol) diallyl ether, di(beta-methyl-glycerol) dimethallyl ether, triglycerol divinyl ether, triglycerol dipropargyl ether, triglycerol dicrotyl ether, triglycerol diallyl ether, triglycerol dichloroallyl ether, triglycerol mono-allyl monovinyl ether, triglycerol trivinyl ether, triglycerol tri-isopropenyl ether, triglycerol tripropargyl ether, triglycerol tri(2-methyl-butyn-3-yl-2) ether, triglycerol tri-allyl ether, triglycerol trimethallyl ether, triglycerol trichloroallyl ether, triglycerol tricrotyl ether, triglycerol tritiglyl ether, triglycerol mono-allyl divinyl ether, triglycerol monovinyl dimethallyl ether, triglycerol monocrotyl divinyl ether, triglycerol tri-allyl ether monoacetate.

Unsaturated ethers of polyglycerols, and particularly those having one unsaturated ether radical per glycerol unit, are usually more conveniently produced from unsaturated glycidyl ethers. The method of production is illustrated by the following reference to the production of the allyl-type ethers. It has been found that if one or more allyl-type glycidyl ethers are heated, in the substantial absence of other reactive compounds, allyl-type ethers of polyglycerols are formed. The latter compounds may be formed also on the storage of allyl-type glycidyl ethers in the absence of special precautions. In each case the compounds are allyl-type ethers of polyglycerols having one allyl-type ether radical per glycerol unit.

The first reaction is believed to be the addition of a molecule of water to an allyl-type glycidyl ether molecule, forming an allyl-type glycerol ether, as represented by the equation

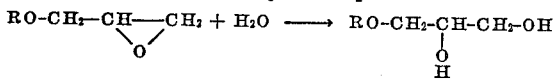

wherein R is an allyl-type radical. Sufficient water is ordinarily present even in substantially anhydrous allyl-type glycidyl ethers to cause this reaction to occur. The allyl-type glycerol ether then reacts with allyl-type glycidyl ether, forming an allyl-type diether of diglycerol, as represented by the following equation

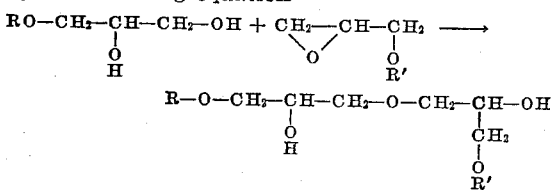

wherein R' is an allyl-type radical, the same as or different from R. Another molecule of an allyl-type glycidyl ether can further react with the allyl-type diether of diglycerol to form an allyl-type triether of triglycerol, the reaction proceeding according to the equation

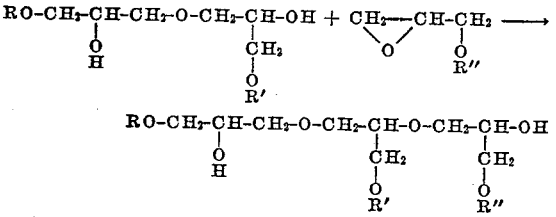

wherein R'' is an allyl-type radical, the same as or different from R and R'. Ethers of higher polyglycerols are formed in an analogous manner by further reaction with additional allyl-type glycidyl ether. Homologues, analogues and suitable substitution products can be produced similarly.

The production of polyglycerol unsaturated ethers from unsaturated glycidyl ethers is promoted by the use of a catalyst. Friedel-Crafts type catalysts are effective. Examples of Friedel-Crafts type catalysts are aluminum chloride, aluminum bromide, antimony pentachloride, ferric chloride, stannic chloride, boron trifluoride, zinc chloride, etc. Stannic chloride and antimony pentachloride are preferred. It is preferred to use only small amounts of Friedel-Crafts catalysts in order to bring about a reaction without polymerizing the allyl-type radicals. From about 0.01% to 1% of a Friedel-Crafts catalyst is usually satisfactory. Larger amounts can be used where it is not desired to prevent the polymerization of the allyl-type radicals or where the reaction is carried out at a low temperature such as below 0°C. which latter precaution has the added advantage of reducing the danger of violence. Ordinarily, however, the reaction can be carried out at room temperature or above, the upper limit of temperature being dependent principally upon the decomposition or degradation of the reactants or products and upon the desirability of avoiding polymerization through the allyl-type radical where such desirability exists. The reaction mixture should be substantially anhydrous where Friedel-Crafts catalysts are used. Other kinds of catalysts which are effective are alkali metal hydroxides, alkali metal oxides and organic bases. In general, these can be used in aqueous solution. Where a catalyst is present the starting molecule of these chain reactions resulting in the formation of polyglycerol allyl-type ethers from an allyl-type glycidyl ether may sometimes be an allyl-type glycerol ether of which a hydroxyl group has been replaced by another group or by an element. For instance, where stannic chloride is used the starting molecule may be an allyl-type ether of chlorohydrin, the chlorine atom of which may be subsequently substituted by a hydroxyl group by hydrolysis.

The reaction can be carried out in the presence or absence of solvent diluents. In most cases any diluent which is used will be a solvent for both the reactants, i. e. allyl-type glycidyl ethers and products, i. e. allyl-type ethers of polyglycerols. However, in some cases there may be used a diluent which is a solvent for the reactants but a non-solvent for the products. A modification consists in the use of a diluent which is a hot-acting solvent for monomer or polymer or both. Molding powders are conveniently formed by carrying out the reaction on a dispersion containing one or more allyl-type glycidyl ethers. The dispersion can be a permanent emulsion or an impermanent suspension. The reactants and the products may constitute either a continuous or a discontinuous phase of the dispersion. Emulsifying, granulating, wetting agents and the like can be present.

With the exception of the addition of a molecule of water to the first allyl-type glycidyl ether molecule, the reactions in the formation of polyglycerol allyl-type ethers from allyl-type glycidyl ethers are all addition-polymerization reactions. They, further, belong to a subclass of addition-polymerization reactions known as oxy-polymerization reactions, in which the product molecules, called oxy-polymers, consist of units joined by ethereal oxygen linkages. The reactions and products are thus distinguished from another subclass of addition-polymerization reactions in which the units of the product molecules are joined by carbon-to-carbon linkages. The latter reactions are called carbo-polymerization, or simply, polymerization, reactions. The products are carbo-polymers, or simply, polymers. The polymerization of styrene is an example of carbo-polymerization.

Polyglycerol allyl-type ethers having one allyl-type ether radical per glycerol unit are accordingly substantially oxy-polymers of allyl-type glycidyl ethers and are herein so termed regardless of the method of their preparation. The oxy-polymerization of an allyl-type glycidyl ether, as practiced, results in a mixture of polyglycerol allyl-type ethers differing principally in the number of glycerol units per molecule.

Polyglycerol unsaturated ethers vary with increasing number of glycerol units from water-like liquids, e. g. unsaturated ethers of diglycerol, to solids which may be readily soluble in many organic solvents or which may be insoluble in substantially all common organic solvents. Unless cross-linking through the unsaturated radicals has occurred, the solid members are thermoplastic, i. e. fusible. Mixtures of the ethers containing higher members are ordinarily solid. They are presumed to have a substantially linear structure.

The polyglycerol unsaturated ethers can be used in a large number of applications, some of which require subsequent infusibilization, other of which are independent thereof. They are valuable plasticizers and tackifiers for natural and synthetic rubber. Those having more than one polymerizable unsaturated ether group per molecule can be used as vulcanizable plasticizers for natural and synthetic resins, cellulose derivatives, protein plastics, etc. Many of the compounds are useful as intermediates in the synthesis of chemicals which can be used as textile assistants, etc. Some of the compounds are desirable compounds of coating compositions, printing inks, impregnating compositions, compression molding, injection molding, extrusion, interlayers and adhesives for laminated articles, etc.

In many instances the monomeric compounds can be used alone; in others they are preferably modified with one or more solvents, swelling agents, plasticizers, tackifiers, dyes, pigments, fillers, oils and plastic substances of many kinds such as natural and synthetic resins, cellulose derivatives, protein plastics, etc. They can be subjected to a variety of physical and chemical treatments to modify their inherent properties and to increase their usefulness. Blowing with air or oxygen, hydrogenation, treatment with sulfur dioxide, chlorination, etc., reduce the unsaturation of the molecule, diminish chemical activity, alter physical characteristics and render the compounds more valuable for applications requiring chemical resistance, unchanging viscosity, etc.

Fusible polyglycerol unsaturated ethers having more than one unsaturated ether group per molecule, including those ethers which are normally liquid, can be infusibilized by cross-linking, involving the allyl-type radicals and resulting in a three-dimensional molecular structure. Cross-linking can be accomplished by the polymerization of the allyl-type radicals, in which the double-bonded carbon atoms of the allyl-type radicals become directly linked to similar carbon atoms of other allyl-type radicals with corresponding reduction in unsaturation. Cross-linking by polymerization is promoted by the use of polymerization catalysts such as organic and inorganic peroxides, perborates, persulfates, oxygen, ozone, etc. It may, however, be made to occur by the use of heat alone, or of actinic light, or of both heat and light. In general, somewhat higher temperatures are required for cross-linking than for the formation of the linear compounds. Temperatures of from about 75° C. to about 250° C. have been employed. Heat can be applied to the material by ordinary means of conduction and/or radiation. Infra-red radiation as a means of heating can be used. Electrostatic heating methods can be used. The reaction can be conducted in a continuous or batchwise manner at atmospheric, reduced or superatmospheric pressures, the latter being preferred. Where high temperatures are employed, it is often advisable to provide the material with a blanket of an inert gas. In addition to catalysts, it may be desirable to have one or more polymerization inhibitors present during infusibilization by polymerization, for the purpose of controlling the rate thereof or of producing a product of certain desired properties.

Cross-linking can be effected also by element conversion or vulcanization, in which the double-bonded carbon atoms of the allyl-type radicals become linked to similar carbon atoms of other allyl-type radicals through one or more atoms of oxygen, sulfur or the like with a corresponding reduction in unsaturation. Oxygen and sulfur therefore promote infusibilization of polyglycerol allyl-type ethers. Other substances promoting infusibilization are cobalt, manganese, lead, etc.; naphthenates, resinates, linoleates, etc. In many cases, as where the material is heated in the presence of atmospheric gases, cross-linking by element conversion may occur concomitantly with cross-linking by polymerization.

Infusibilization of polyglycerol unsaturated ethers can be accomplished upon a body of the material in massive state. It can also be done with solutions of soluble ethers or with dispersions which may be permanent emulsions or impermanent suspensions. Emulsifying agents, granulating agents, wetting agents, etc., can be present. Infusibilization can sometimes be accomplished by atomizing the ethers, or a solution thereof, in the form of a fine spray into a heated chamber containing an inert gas. Sometimes it is desirable to infusibilize polyglycerol allyl-type ethers in the form of a thin sheet which may be subsequently stripped from the surface to which it was applied or left on the surface in the form of a coating. The ethers can be used to impregnate fabric and can then be infusibilized while held dispersed in the interstices thereof. Infusibilization may be continuous or discontinuous, and may be conducted at atmospheric, superatmospheric or reduced pressure.

The compounds can be infusibilized individually or in admixture with one another or with other modifying substances. Examples of modifying substances are solvents, swelling agents, plasticizers, dyes, pigments and fillers. Others are drying and semi-drying oils such as soy, linseed, Perilla, fish, tung, sunflower, oiticica, and dehydrated castor oil. Non-drying oils are cottonseed, cocoanut and castor oils; oils obtainable by the hydrolysis of the foregoing oils; protein plastics; cellulose derivatives such as cellulose nitrate, cellulose acetate, cellulose acetobutyrate, ethyl cellulose, etc.; natural resins such as gilsonite, rosin, colophony, shellac, copal, dammar gum, pitch and asphalt; and synthetic plastics. An important group of synthetic resins comprises thermosetting resins. Of these some are of the condensation type such as phenol formaldehyde, urea formaldehyde, and some alkyds. Another important group of synthetic resins which can be infusibilized are those having two or more polymerizable unsaturated carbon-to-carbon linkages unconjugated with respect to carbon. Examples are the unsaturated polyesters of saturated polycarboxylic acids such as vinyl, allyl and methallyl esters of oxalic, malonic, succinic, glutaric, adipic, sebacic, citric, tartaric, phthalic, isophthalic and naphthalene dicarboxylic acids; unsaturated polyesters of polybasic inorganic acids such as vinyl, allyl, methallyl, cyclohexenyl esters of the ortho acids of silicon and boron and the corresponding esters of sulfuric and phosphoric acids; unsaturated carboxylic acid polyesters of unsaturated polyhydric alcohols such as acrylic and methacrylic polyesters of glycol, diethylene glycol, triethylene glycol, trimethylene glycol, glycerol, etc.; unsaturated polyethers of polyhydric alcohols such as vinyl, allyl and methallyl polyethers of glycol, diethylene glycol, triethylene glycol, trimethylene glycol, glycerol, etc.; ethers having two or more unsaturated aliphatic radicals such as vinyl, allyl, methallyl and crotyl diethers; unsaturated esters of unsaturated acids such as vinyl, allyl and methallyl esters of acrylic and methacrylic acids. Among the thermoplastic synthetic plastics are many of the alkyd-type resins, superpolyamides, superpolyester-amides and polymers of polymerizable organic compounds having a single polymerizable unsaturated carbon-to-carbon linkage in the molecule, examples of which are unsaturated esters of saturated monobasic acids such as vinyl, allyl and methallyl esters of acetic, propionic, butyric, etc., acids, saturated esters of unsaturated monobasic acids such as methyl, ethyl, propyl, etc., esters of acrylic and methacrylic acids; styrene; alpha-methyl styrene; ethylene; vinyl halides; vinylidene halides; allyl alcohol; allyl halides, etc. Some plastics are formed by the chemical after-treatment of one or more other plastics. Typical examples of these are polyvinyl acetals, after-chlorinated polyvinyl chloride, etc. Another group of plastics consists of synthetic rubbers, particularly those formed by the polymerization and copolymerization of conjugated butadiene, the conjugated pentadienes, the conjugated hexadienes, etc.

These and other synthetic plastics can be present as such during the infusibilization of the polyglycol allyl-type ethers. However, if desired there may be used instead of the plastics themselves substances capable of forming the plastics. For instance, monomers instead of polymers of polymerizable unsaturated organic compounds, where present during infusibilization, often undergo polymerization and may become chemically involved with the polyglycerol allyl-type ethers.

Where the modifiers are not added before or during infusibilization they can be added afterward by grinding, molding, soaking in the presence of swelling agents or by other of the many methods known in the art.

The polyglycerol allyl-type ethers are ordinarily given a particular shape prior to infusibilization. They can, for instance, be transferred to a mold or they can be applied as a coating on one or more surfaces or an article. The shaping of the material is sometimes facilitated by admixture with a solvent or swelling agent or by forming a dispersion bearing the polymer in continuous or discontinuous phase. Latex-like emulsions formed by the synthesis of the material in emulsion can be given shape in any of a number of different ways followed by the removal of the dispersing medium and by infusibilization. Fabric, paper and other bibulous material can be impregnated with emulsions, solutions or undiluted fusible material. In many cases the shaping and infusibilization of the material occur substantially simultaneously. This situation may exist, for instance, in compression molding, injection molding and extrusion.

While it is best to give any desired shape to the material before infusibilization, infusible material can, nevertheless, be manipulated by proper procedure. Malaxating the material on hot rolls or in a screw stuffer has bene found to render the material practically thermoplastic, in which state it can be used in coating, molding, and extruding operations, and subsequently infusibilized by heating.

The properties of the thermoplastic and of the infusible forms of the material can be modified by various kinds of treatment such as by blowing with oxygen, by hydrogenation, by treatment with sulfur dioxide, by chlorination, etc.

In addition to the uses already mentioned, the compounds of the invention can be used in electrical insulation, laminates, cast objects, optical equipment, fibrous stiffening material, etc.

Some of the many ways in which the invention can be carried out are illustrated by the following examples, in which parts are on a weight basis.

*Example I*

A small amount of stannic chloride was added to a solution comprising equal parts of allyl glycidyl ether and benzene at room temperature. A vigorous exothermic reaction ensued, following which most of the solvent was removed by flash distillation. Remaining solvent and unreacted monomer were removed by distillation at 100° C. at 2 mm. pressure. A small amount of a mixture of cobalt, manganese and lead naphthenates was added to a portion of the residue. The mixture was then spread in a thin film upon a sheet of metal and baked at 60° C. The resulting film, which comprised a cross-linked mixture of allyl polyglycerol ethers having one allyl group per glycerol unit, was hard and tough.

*Example II*

A mixture of 57 parts of allyl glycidyl ether, 49 parts of maleic anhydride and 106 parts of benzene was heated in an open vessel. A thin film of the resulting product baked at 60° C. for several hours was hard and tough. Similar products are obtained from mixtures of maleic acid with allyl glycidyl ether, maleic acid with chloroallyl glycidyl ether, and maleic acid with vinyl glycidyl ether, etc.

*Example III*

A mixture of 200 parts of allyl glycidyl ether and 1 part stannic chloride in the absence of solvent was heated in an open vessel for a short time. The resin which formed was hard, infusible and insoluble in all common organic solvents after baking. Related resins are obtained in the same way from vinyl glycidyl ether, chloroallyl ether, etc.

We claim as our invention:

1. A process for the production of an allyl polyether of a polyglycerol having one allyloxy radical attached to each glycerol unit which comprises bringing stannic chloride into contact with allyl glycidyl ether in the presence of an organic solvent diluent under substantially anhydrous conditions.

2. A process for the production of an allyl polyether of a polyglycerol having one allyloxy radical attached to each glycerol unit which comprises bringing a Friedel-Crafts catalyst into contact with allyl glycidyl ether in the presence of an organic solvent diluent under substantially anhydrous conditions.

3. A process for the production of an allyl polyether of a polyglycerol having one allyloxy radical attached to each glycerol unit which comprises heating allyl glycidyl ether under substantially anhydrous conditions and in the presence of a Friedel-Crafts catalyst to a temperature between room temperature and the temperature at which a substantial decomposition of the organic components occur.

4. A process for the production of an unsaturated polyether of a polyglycerol having one unsaturated ether group attached to each glycerol unit which comprises bringing a Friedel-Crafts catalyst into contact with a glycidyl ether of an unsaturated acyclic alcohol of from 2 to 13 carbon atoms containing an olefinic double bond between two carbon atoms at least one of which is not more than once removed from the hydroxyl group and containing one unsaturated carbon-to-carbon linkage for each 6 carbon atoms, in the presence of an organic solvent diluent under substantially anhydrous conditions.

5. A process for the production of an unsaturated polyether of a polyglycerol having one unsaturated ether group attached to each glycerol unit which comprises bringing stannic chloride into contact with a glycidyl ether of an unsaturated acyclic alcohol of from 2 to 13 carbon atoms containing an olefinic double bond between two carbon atoms at least one of which is not more than once removed from the hydroxyl group and containing one unsaturated carbon-to-carbon linkage for each 6 carbon atoms, in the presence of an organic solvent diluent under substantially anhydrous conditions.

6. A process for the production of an unsaturated polyether of a polyglycerol having one unsaturated ether group attached to each glycerol unit which comprises bringing a Friedel-Crafts catalyst into contact, at a temperature between room temperature and the temperature at which a substantial decomposition of the organic components occur, with a glycidyl ether of an unsaturated acyclic alcohol of from 2 to 13 carbon atoms containing an olefinic double bond between two carbon atoms at least one of which is not more than once removed from the hydroxyl group and containing one unsaturated carbon-to-carbon linkage for each 6 carbon atoms, in the presence of an organic solvent diluent under substantially anhydrous conditions.

7. A process for the production of a terminally unsaturated polyether of a polyglycerol which comprises heating, in the presence of a Friedel-Crafts catalyst under substantially anhydrous conditions, to a temperature between room temperature and the temperature at which substantial decomposition of the organic components occurs, a glycidyl ether of an aliphatic alcohol having a terminal methylene group attached by a double bond to a carbon atom which is directly attached to a saturated carbinol carbon atom, containing from 3 to 13 carbon atoms and containing one unsaturated carbon-to-carbon linkage for each 6 carbon atoms.

8. A process for the production of a terminally unsaturated polyether of a polyglycerol which comprises heating, in the presence of a Friedel-Crafts catalysts and an organic solvent diluent, under substantially anhydrous conditions, and to a temperature between room temperature and the temperature at which substantial decomposition of the organic components occurs, a glycidyl ether of an aliphatic alcohol having a terminal methylene group attached by a double bond to a carbon atom which is directly attached to a saturated carbinol atom, containing from 3 to 13 carbon atoms and containing one unsaturated carbon-to-carbon linkage for each 6 carbon atoms.

THEODORE W. EVANS.
EDWARD C. SHOKAL.

REFERENCES CITED

The following references are of record in the file of this patent:

UNITED STATES PATENTS

| Number | Name | Date |
|---|---|---|
| 2,089,569 | Orthner et al. | Aug. 10, 1937 |
| 2,201,074 | Britton et al. | May 14, 1940 |
| 2,258,892 | Harris | Oct. 14, 1941 |
| 2,273,891 | Pollack et al. | Feb. 24, 1942 |
| 2,314,039 | Evans et al. | Mar. 16, 1943 |
| 2,332,895 | D'Alelio | Oct. 26, 1943 |
| 2,343,053 | Grun | Feb. 29, 1944 |

FOREIGN PATENTS

| Number | Country | Date |
|---|---|---|
| 421,867 | Great Britain | Jan. 1, 1935 |
| 499,879 | Great Britain | Jan. 27, 1939 |

Certificate of Correction

Patent No. 2,450,234 — September 28, 1948

THEODORE W. EVANS ET AL.

It is hereby certified that error appears in the printed specification of the above numbered patent requiring correction as follows:

Column 2, line 23, for "butyl-3-ol-2" read *butyn-3-ol-2*; column 3, line 17, for "cyclohex-2-" read *cyclohexen-2-*; column 6, line 32, for "desirable compounds" read *desirable components*; column 8, line 47, for "glycol" read *glycerol*; column 9, line 9, for "bene" read *been*; column 10, line 72, for "catalysts" read *catalyst*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*